United States Patent
Xu et al.

(10) Patent No.: US 10,200,977 B2
(45) Date of Patent: Feb. 5, 2019

(54) SYSTEM INFORMATION BLOCK CHANNEL DESIGN FOR ENHANCED MACHINE TYPE COMMUNICATION WITH COVERAGE ENHANCEMENTS

(71) Applicant: QUALCOMM Incorporated, San Diego, CA (US)

(72) Inventors: Hao Xu, San Diego, CA (US); Seyed Ali Akbar Fakoorian, San Diego, CA (US); Peter Gaal, San Diego, CA (US); Wanshi Chen, San Diego, CA (US); Madhavan Srinivasan Vajapeyam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 303 days.

(21) Appl. No.: 15/008,346

(22) Filed: Jan. 27, 2016

(65) Prior Publication Data

US 2016/0227345 A1    Aug. 4, 2016

Related U.S. Application Data

(60) Provisional application No. 62/109,927, filed on Jan. 30, 2015.

(51) Int. Cl.
| | |
|---|---|
| H04W 4/00 | (2018.01) |
| H04W 72/04 | (2009.01) |
| H04W 4/06 | (2009.01) |
| H04L 5/00 | (2006.01) |
| H04W 4/70 | (2018.01) |
| H04L 12/18 | (2006.01) |

(52) U.S. Cl.
CPC ....... *H04W 72/0406* (2013.01); *H04L 5/0053* (2013.01); *H04W 4/06* (2013.01); *H04W 4/70* (2018.02); *H04L 12/189* (2013.01)

(58) Field of Classification Search
CPC ... H04W 4/005; H04W 4/06; H04W 72/0406; H04W 72/04; H04W 72/042; H04W 72/0453; H04W 72/0446; H04L 5/0053; H04L 12/189; H04L 5/0033
See application file for complete search history.

(56) References Cited

U.S. PATENT DOCUMENTS

| | | | |
|---|---|---|---|
| 2011/0026645 A1* | 2/2011 | Luo | H04L 1/0038 375/340 |
| 2013/0083753 A1* | 4/2013 | Lee | H04W 72/0453 370/329 |
| 2014/0071957 A1 | 3/2014 | Xu et al. | |

(Continued)

OTHER PUBLICATIONS

International Search Report and Written Opinion—PCT/US2016/015277—ISA/EPO—May 10, 2016.

(Continued)

*Primary Examiner* — Hoang-Chuong Q Vu
(74) *Attorney, Agent, or Firm* — Anthony R. Morris

(57) ABSTRACT

Aspects of the present disclosure provided techniques that for wireless communications by a user equipment (UE). An exemplary method, performed by a UE, generally includes determining one or more locations for receiving system information for machine type communication (MTC) over a bundled transmission and decoding the system information received at the locations over the bundled transmission.

23 Claims, 8 Drawing Sheets

(56) References Cited

U.S. PATENT DOCUMENTS

| | | | |
|---|---|---|---|
| 2014/0301268 A1* | 10/2014 | Xu | H04W 24/02 |
| | | | 370/312 |
| 2014/0301305 A1 | 10/2014 | Xu et al. | |
| 2015/0029903 A1* | 1/2015 | Chen | H04W 72/0446 |
| | | | 370/277 |
| 2015/0257173 A1* | 9/2015 | You | H04L 1/1864 |
| | | | 370/330 |
| 2016/0119900 A1* | 4/2016 | You | H04L 5/0094 |
| | | | 370/336 |
| 2016/0219607 A1* | 7/2016 | You | H04W 72/0453 |
| 2016/0269872 A1* | 9/2016 | Kim | H04W 4/70 |
| 2016/0353473 A1* | 12/2016 | Chen | H04W 4/70 |
| 2017/0180098 A1* | 6/2017 | You | H04L 5/0055 |
| 2017/0311232 A1* | 10/2017 | Yi | H04W 48/12 |

OTHER PUBLICATIONS

LG Electronics: "PBCH Transmission for MTC Coverage Enhancement", 3GPP Draft; R1-135458 MTC_PBCH Force (Final), 3rd Generation Partnership Project (3GPP), Mobile Competence Centre; 650, Route Des Lucioles ; F-06921 Sophia-Antipolis Cedex; France vol. RAN WG1, No. San Francisco, USA; Nov. 11, 2013-Nov. 15, 2013 Nov. 13, 2013 (Nov. 13, 2013), XP050735131, Retrieved from the Internet: URL:http://www.3gpp.org/ftp/Meetings_3GPP_SYNC/RAN/RAN1/Docs/ [retrieved on Nov. 13, 2013].

\* cited by examiner

SYSTEM INFORMATION BLOCK CHANNEL DESIGN FOR ENHANCED MACHINE TYPE COMMUNICATION WITH COVERAGE ENHANCEMENTS

CROSS-REFERENCE TO RELATED APPLICATION

This application claims priority to U.S. Provisional Patent Application No. 62/109,927, filed on Jan. 30, 2015, which is hereby expressly incorporated by reference in its entirety.

BACKGROUND

I. Field

Certain aspects of the present disclosure generally relate to wireless communications and, more particularly, to obtaining a system information block (SIB) for certain wireless devices, such as machine type communication (MTC) devices with coverage enhancements.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, etc. Some UEs may be considered machine-type communication (MTC) UEs, which may include remote devices, such as sensors, meters, location tags, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance SIB acquisition of MTC devices with coverage enhancement for MTC services when it is unknown whether a network is configured with Multimedia Broadcast Multicast Service (MBMS) or Multi-Broadcast Single Frequency Network (MBSFN), the bandwidth and mode of the network may be used to determine a timing for acquiring system data.

SUMMARY

Certain aspects of the present disclosure provide techniques and apparatus for communicating control channels to certain devices, such as machine type communication (MTC) UEs.

Certain aspects of the present disclosure provide a method for wireless communications by a user equipment (UE). The method generally includes determining one or more locations for receiving system information for machine type communication (MTC) over a bundled transmission and decoding the system information received at the plurality of locations over the bundled transmission.

Certain aspects of the present disclosure provide an apparatus comprising at least one processor and a memory coupled to the at least one processor with instructions stored thereon. The apparatus generally includes at least one processor configured to determine a plurality of locations for receiving system information for machine type communication (MTC) over a bundled transmission and decode the system information received at the plurality of locations over the bundled transmission.

Certain aspects of the present disclosure provide a method for wireless communications by a base station (BS). The method generally includes determining one or more locations for transmitting system information for machine type communication (MTC) over a bundled transmission to a user equipment (UE); and transmitting the system information at the locations over the bundled transmission.

Certain aspects of the present disclosure provide an apparatus comprising at least one processor and a memory coupled to the at least one processor with instructions stored thereon. The apparatus generally includes at least one processor configured to determine one or more locations for transmitting system information for machine type communication (MTC) over a bundled transmission to a user equipment (UE); and transmit the system information at the locations over the bundled transmission.

Numerous other aspects are provided including methods, apparatus, systems, computer program products, and processing systems.

DETAILED DESCRIPTION

Aspects of the present disclosure provide techniques that may help enable efficient communication between a base station and machine type communication (MTC) based user equipments (UEs). For example, the techniques may provide a design for a control channel targeting MTC UEs, using a narrowband (e.g., a six-PRB) based search space for communication. This search space may be transmitted in a subset of subframes within a wideband system and convey scheduling information for cell configuration information.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
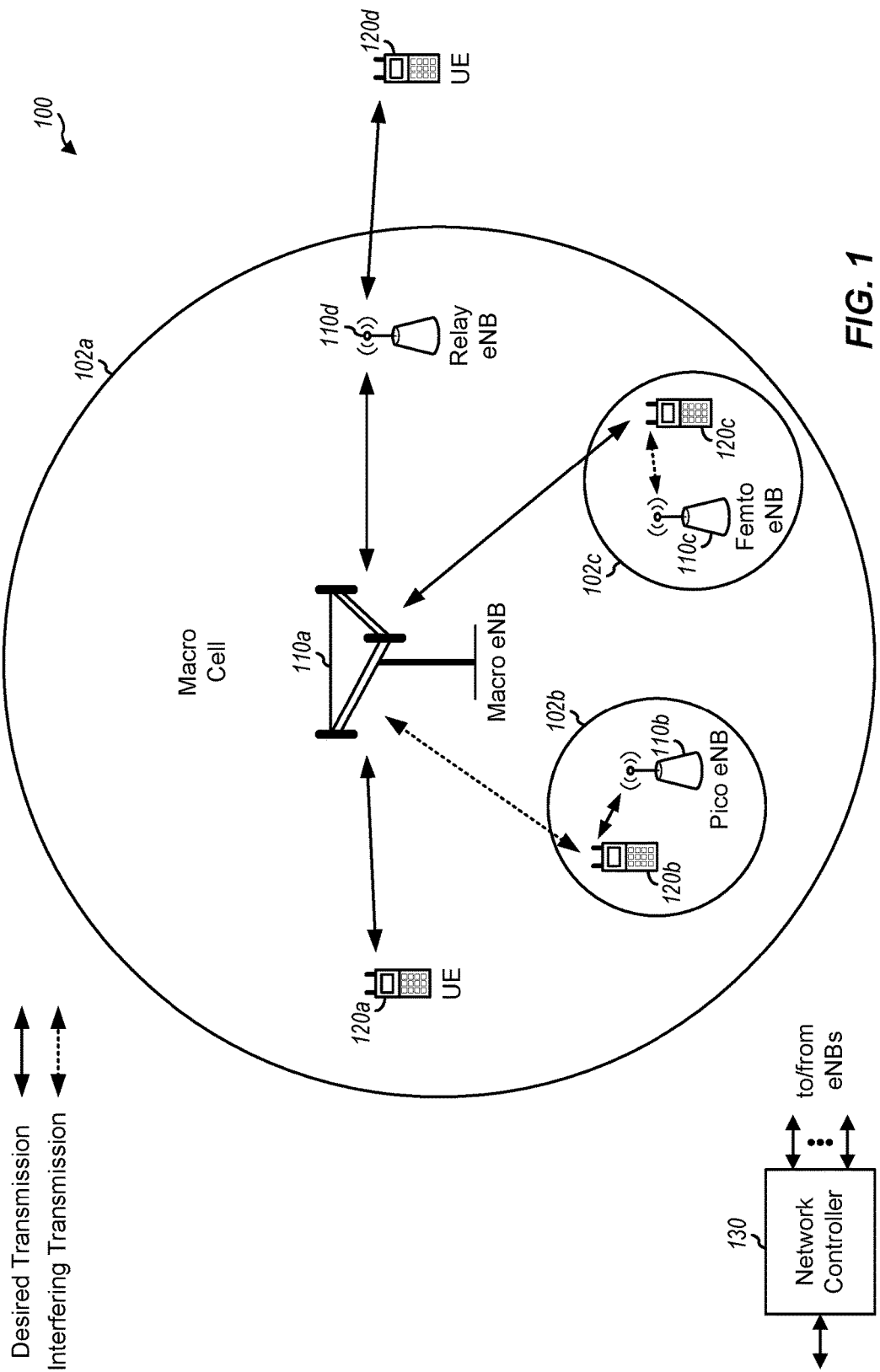
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
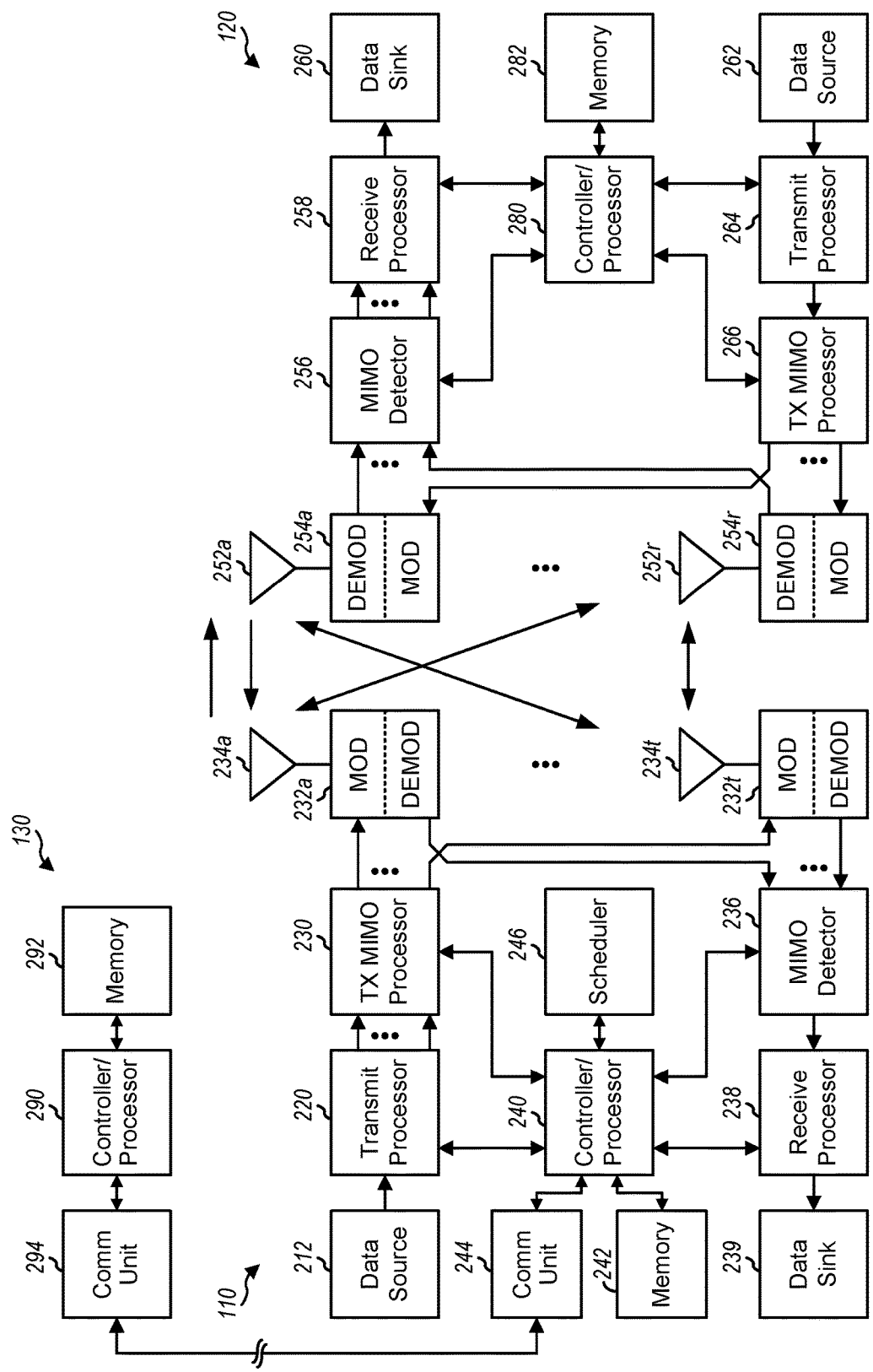
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding scheme (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 800 shown in FIG. 8. Similarly, processor 280 and/or other processors and modules at UE 120, may perform or direct operations 7000 shown in FIG. 7. Memories 242 and 282 may store data and program codes for base station 110 and UE 120, respectively. A scheduler 246 may schedule UEs for data transmission on the downlink and/or uplink.

Figure 3:
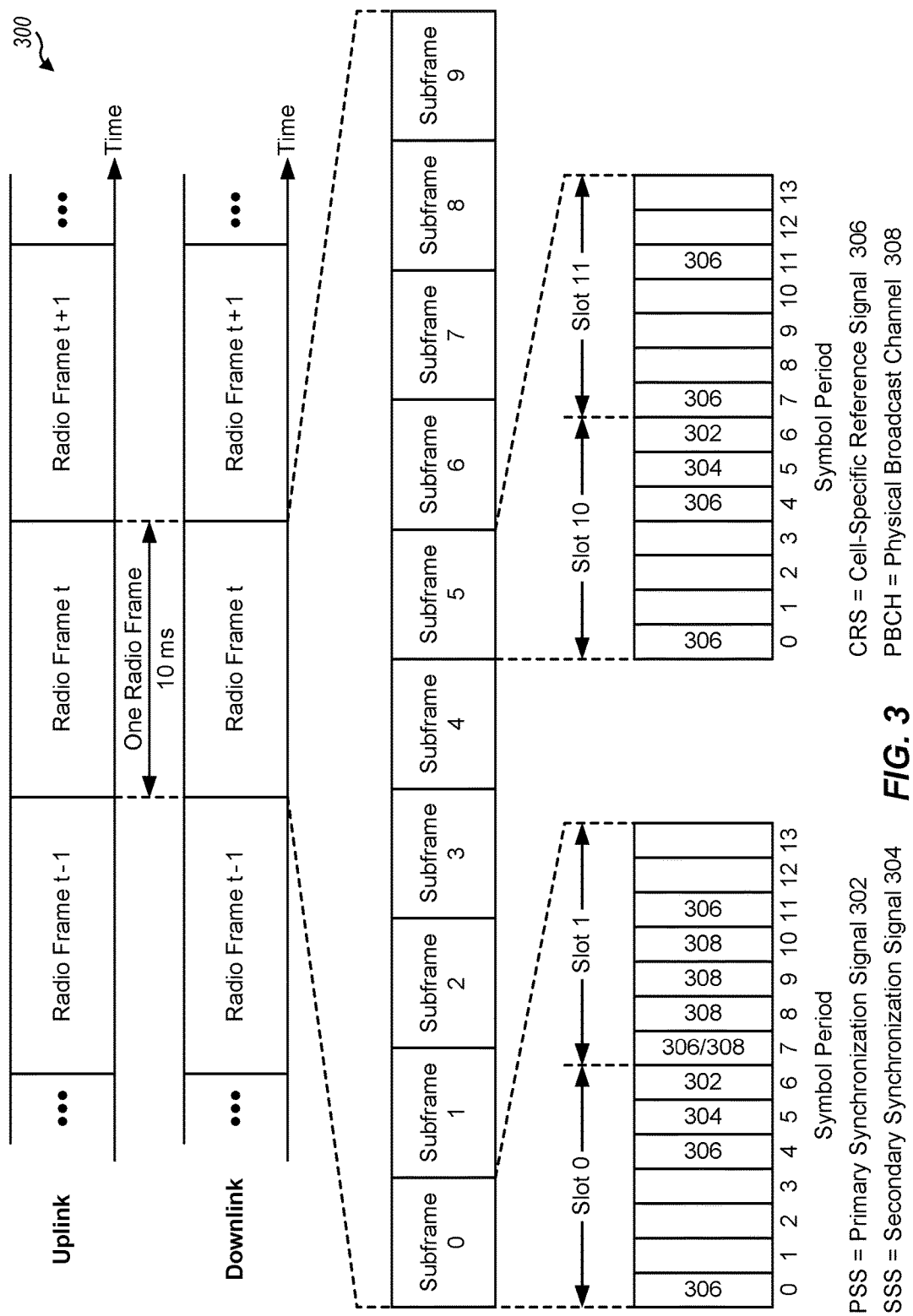
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) 302 and a secondary synchronization signal (SSS) 304 on the downlink in the center of the system bandwidth for each cell supported by the eNB. The PSS 302 and SSS 304 may be transmitted in symbol periods 6 and 5, respectively, in subframes 0 and 5 of each radio frame with the normal cyclic prefix, as shown in FIG. 3. The PSS 302 and SSS 304 may be used by UEs for cell search and acquisition and may contain, among other information, the cell ID along with an indication of the duplexing mode. The indication of the duplexing mode may indicate whether the cell utilizes a time division duplexing (TDD) or frequency division duplexing (FDD) frame structure. The eNB may transmit a cell-specific reference signal (CRS) 306 across the system bandwidth for each cell supported by the eNB. The CRS 306 may be transmitted in certain symbol periods of each subframe and may be used by the UEs to perform channel estimation, channel quality measurement, and/or other functions. The eNB may also transmit a physical broadcast channel (PBCH) 308 in symbol periods 0 to 3 in slot 1 of certain radio frames. The PBCH 308 may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
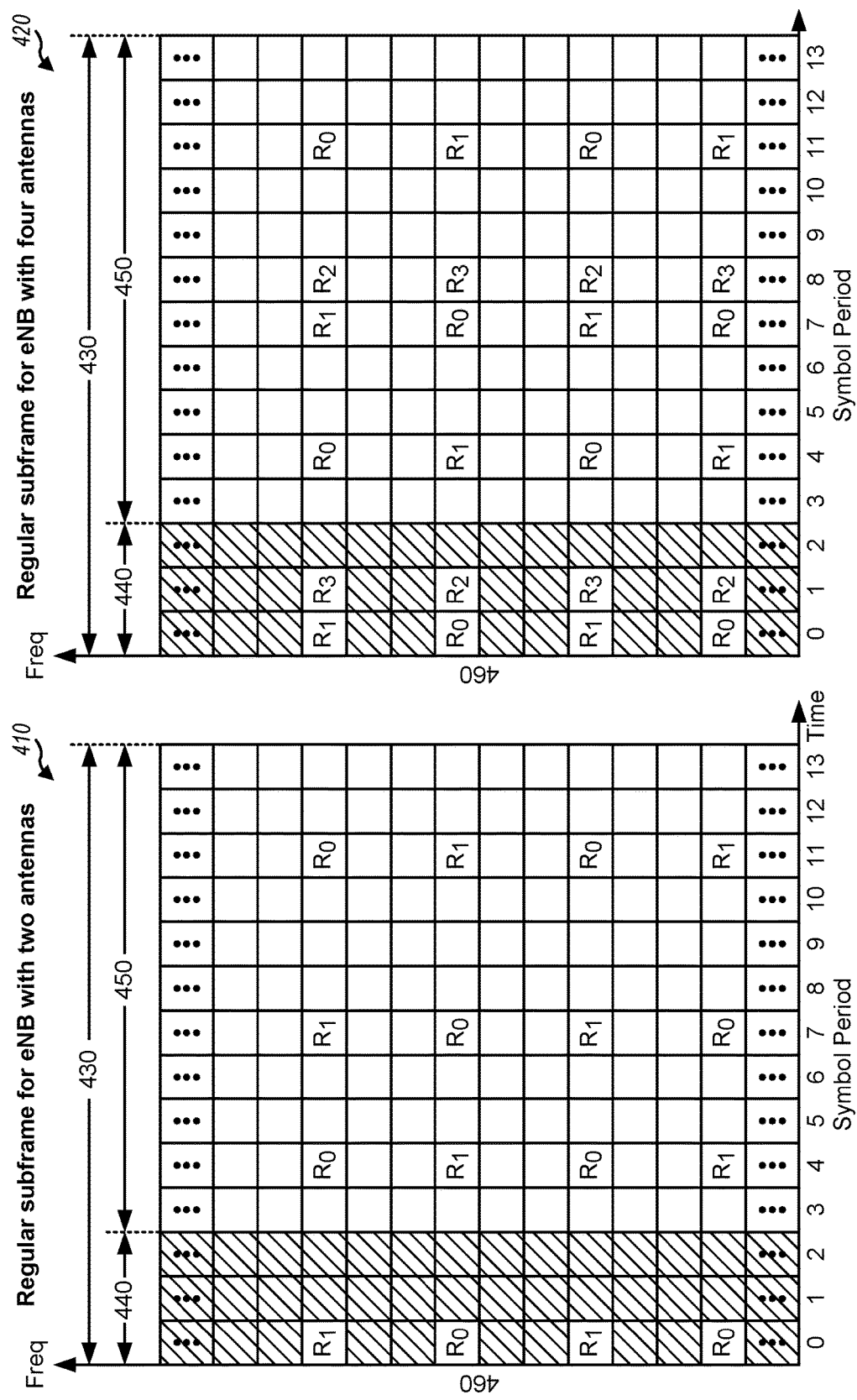
FIG. 4 is a block diagram conceptually illustrating two exemplary subframe formats with the normal cyclic prefix

FIG. 4 shows two exemplary subframe formats 410 and 420 with the normal cyclic prefix. A subframe 430 may include a control region 440 and a data region 450. The available time frequency resources may be partitioned into resource blocks. Each resource block may cover 12 subcarriers 460 in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

An evolved Multimedia Broadcast and Multicast Service (eMBMS) in a Multimedia Broadcast Single Frequency Network (MBSFN) may be formed by the eNBs in a cell to form a MBSFN area. ENBs may be associated with multiple MBSFN areas, for example, up to a total of eight MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Thus a first MBSFN area may support a first eMBMS broadcast service, such as by providing a particular news broadcast to UE and a second MBSFN area may support a second eMBMS broadcast service, such as by providing a different news broadcast to second UE. Each MBSFN area supports a plurality of physical multicast channels (PMCH) (e.g., 15 PMCHs).

Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

The subframes configured to carry the MBSFN information can vary depending on the diversity mode of the cell. In general, MBSFN can be carried in all subframes except those only available for DL to the UE and special subframes. For example, where the cell is configured for FDD, MBSFN may be configured in all subframes except 0, 4, 5, and 9. For TDD operations, MBSFN may be configured in all subframes except 0, 1, 5, and 6, as subframes 1 and 6 are special subframes and subframes 0 and 5 are DL subframes in TDD.

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 µs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

In some systems, for example, in LTE Rel-13, the MTC may be limited to a particular assigned narrowband service bandwidth (e.g., of no more than six resource blocks (RBs)) within the available system bandwidth. However, the MTC may be able to re-tune (e.g., operate and/or camp) to different narrowband regions within the available system bandwidth of the LTE system, for example, in order to co-exist within the LTE system.

As another example of coexistence within the LTE system, MTCs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the MTC may be able to receive the legacy PBCH with one or more additional repetitions of the PBCH across multiple subframes. As another example, the MTC may be able to transmit one or more repetitions of PRACH (e.g., with one or more PRACH formats supported) to an eNB in the LTE system. The PRACH may be used to identify the MTC. Also, the number of repeated PRACH attempts may be configured by the eNB.

The MTC may also be a link budget limited device and may operate in different modes of operation (e.g. entailing different amounts of repeated messages transmitted to the MTC) based on its link budget limitation. For example, in some cases, the MTC may operate in a normal coverage mode in which there is little to no repetition (i.e., the amount of repetition needed for the UE to successfully receive a message may be low or repetition may not even be needed).

In some cases, the MTC may operate in a coverage enhancement (CE) mode in which there may be high amounts of repetition. Examples of coverage enhancement techniques may include repetition within subframes, repetition across different subframes, repetition of various channels, power boosting, and spatial multiplexing. For example, for a 328 bit payload, a MTC in CE mode may need 150 or more repetitions of the payload in order to successfully receive the payload.

In some cases, e.g., also for LTE Rel-13, the MTC may have limited capabilities with respect to its reception of broadcast and unicast transmissions. For example, the maximum transport block (TB) size for a broadcast transmission received by the MTC may be limited to 1000 bits. Additionally, in some cases, the MTC may not be able to receive more than one unicast TB in a subframe. In some cases (e.g., for both the CE mode and normal mode described above), the MTC may not be able to receive more than one broadcast TB in a subframe. Further, in some cases, the MTC may not be able to receive both a unicast TB and a broadcast TB in a subframe.

MTCs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-MTCs. For example, as compared to conventional paging messages used in LTE, MTCs may able to monitor and/or receive paging messages that non-MTCs may not able to monitor and/or receive. Similarly, as compared to conventional random access response (RAR) messages used in a conventional random access procedure, MTCs may be able to receive RAR messages that also may not be able to be received by non-MTCs. The new paging and RAR messages associated with MTCs may also be repeated one or more times (e.g., "bundled"). In addition, different numbers of repetitions (e.g., different bundling sizes) for the new messages may be supported.

Figure 5:
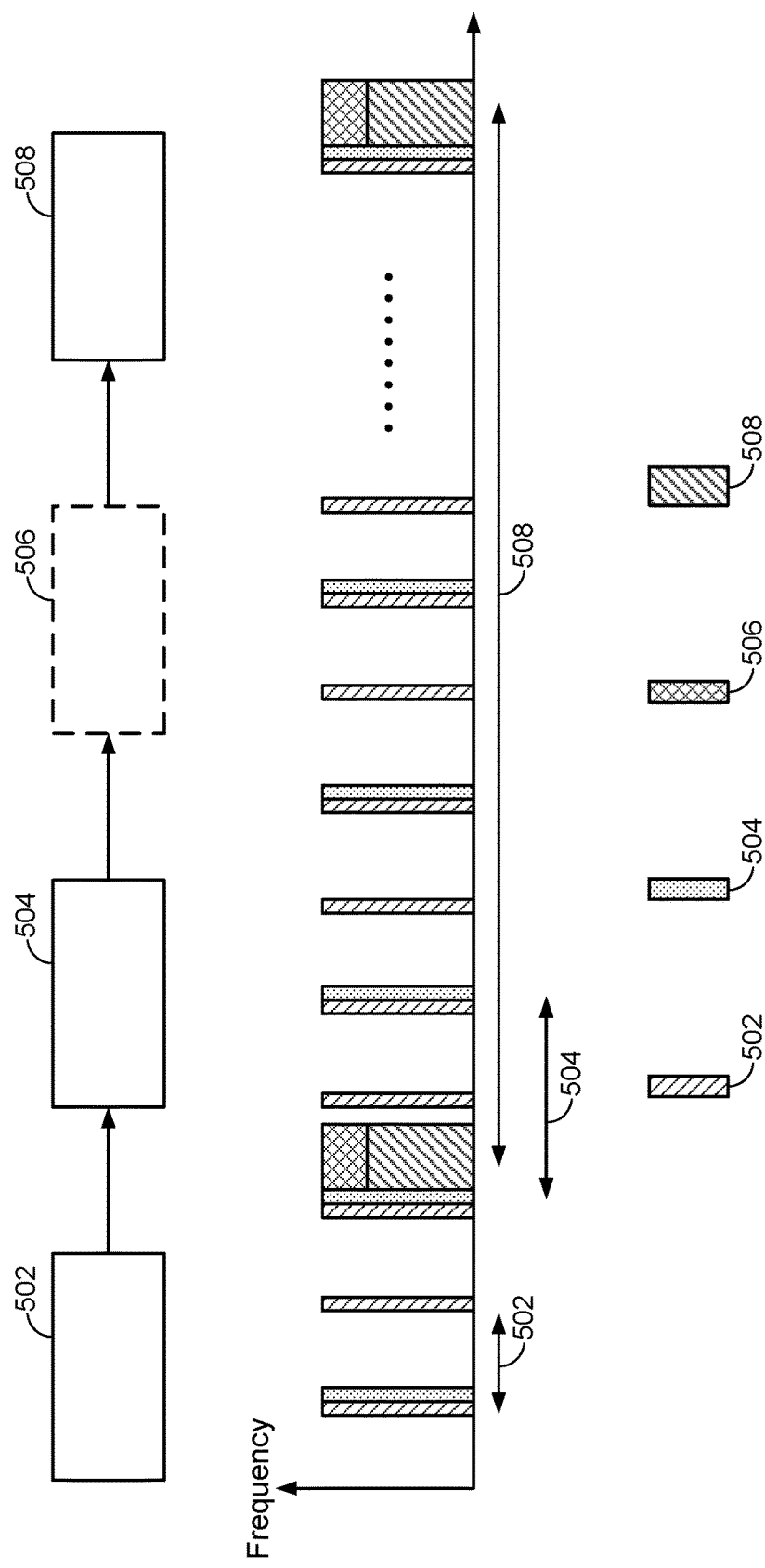
FIG. 5 illustrates an example of control signaling for MTC co-existence within a wideband system, such as LTE, in accordance with certain aspects of the present disclosure.

FIG. 5 illustrates an example of control signaling for MTC co-existence within a wideband system, such as LTE, in accordance with certain aspects of the present disclosure. As shown, after receiving and processing the PSS/SSS 502 signal, an eNB is synchronized with the cell and may receive the PBCH 504. The PSS/SSS signal may, for example, have a 5 ms periodicity. The PBCH 504 may contain the master information block (MIB) carrying information including system and scheduling information, such a cell bandwidth, antenna configuration, system frame number (SFN), or ePDCCH scheduling information, and may, for example, have a periodicity of 10 ms. Using scheduling information contained MIB, the eNB may be able to receive the enhanced physical downlink control channel (ePDCCH), which spans the length of an entire subframe. The ePDCCH in turn provides a schedule for the MTC specific system information block (MTC_SIB) 508. The MTC_SIB 508 contains essential cell configuration including the TDD configuration as well as the MBSFN information, and may, for example, have a periodicity of 80 ms.

Figure 6:
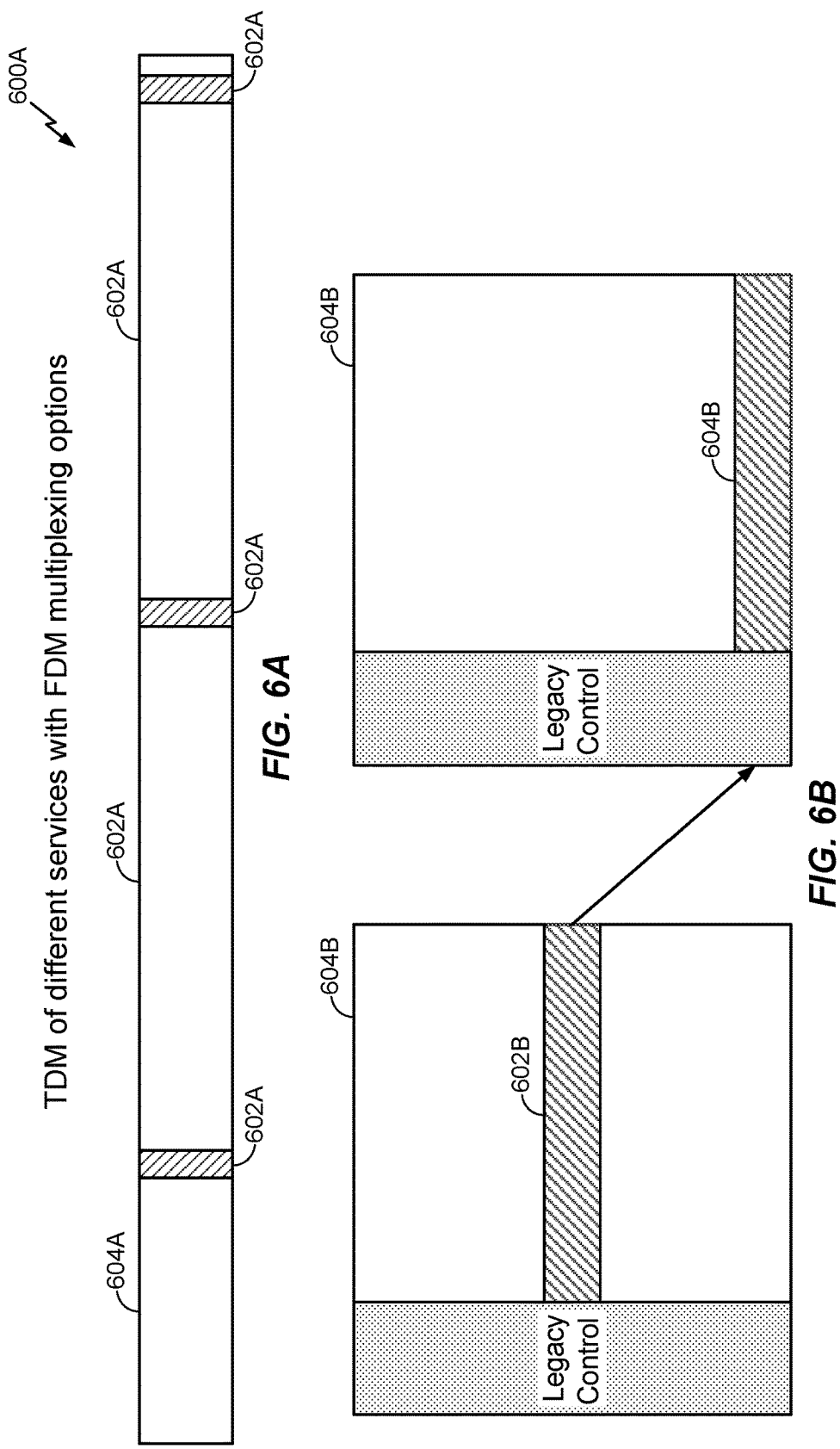
FIGS. 6A and 6B illustrate an example of MTC coexistence within a wideband system, such as LTE, in accordance with certain aspects of the present disclosure.

As mentioned above, MTC and/or MTC operation may be supported in the wireless communication network (e.g., in coexistence with LTE or some other RAT). FIGS. 6A and 6B, for example, illustrate an example of how MTCs in MTC operation may co-exist within a wideband system, such as LTE.

As illustrated in the example frame structure 600A of FIG. 6A, subframes associated with MTC and/or MTC operation 602A may be time division multiplexed (TDM) with regular subframes associated with LTE (or some other RAT) 604A operating in a wider system bandwidth (e.g., 1.4/3/5/10/15/20 MHz). Additionally or alternatively, as illustrated in the example frame structure of FIG. 6B, one or more narrowband regions 602B and 604B used by MTCs in MTC operation may be frequency division multiplexed within the wider bandwidth supported by LTE.

Multiple narrowband regions, with each narrowband region spanning a bandwidth that is no greater than a total of 6 RBs, may be supported for MTC and/or MTC operation. In some cases, each MTC in MTC operation may operate within one narrowband region (e.g., at 1.4 MHz or 6 RBs) at a time. MTCs in MTC operation may also, at any given time, re-tune to other narrowband regions in the wider system bandwidth. In some examples, multiple MTCs may be served by the same narrowband region. In other examples, multiple MTCs may be served by different narrowband regions (e.g., with each narrowband region spanning 6 RBs). In yet other examples, different combinations of MTCs may be served by one or more same narrowband regions and/or one or more different narrowband regions.

The MTCs may operate (e.g., monitor/receive/transmit) within the narrowband regions for various different operations. For example, as shown in FIG. 6B, a first narrowband region 602B (e.g., spanning no more than 6 RBs of the wideband data) of a subframe 604B may be monitored by one or more MTCs for either a PSS, SSS, PBCH, MTC signaling, or paging transmission from a BS in the wireless communication network. MTC signaling may comprise MTC specific signals or channels. For example, configuration of MTC UEs may be accomplished using a MTC system information block (MTC_SIB) targeting MTCs. The MTC_SIB may further be bundled in the ePDDCH. As also shown in FIG. 6B, a second narrowband region 606B (e.g., also spanning no more than 6 RBs of the wideband data) of the subframe 604B may be used by MTCs to transmit a RACH or data previously configured in signaling received from a BS. In some cases, the second narrowband region 606B may be utilized by the same MTCs that utilized the first narrowband region 602B (i.e., the MTCs may have re-tuned to the second narrowband region 606B to transmit after monitoring in the first narrowband region 602B). In some cases (although not shown), the second narrowband region 606B may be utilized by different MTCs than the MTCs that utilized the first narrowband region 602B.

Although the examples described herein assume a narrowband of 6 RBS, those skilled in the art will recognize that the techniques presented herein may also be applied to different sizes of narrowband regions.

In certain systems (e.g., long term evolution (LTE) Release 8 or more recent), transmission time interval (TTI) bundling (e.g., subframe bundling) can be configured on a per-UE basis. Devices having limited communications resources, such as MTC devices, may have limited diversity. For example, a device having limited communications resources may have a single receiver, which may limit spatial diversity. These devices may have limited or no mobility, which may limit time diversity. Additionally, these devices may be limited to a narrowband assignment, which may limit frequency diversity.

In certain implementations, increased diversity may be achieved for devices with limited communications resources using frequency hopping. That is, the frequency at which an MTC device communicates may change periodically. For example, bursts may be transmitted on alternating frequencies (paired hopping) or frequency hopping as a function of the cell ID which may allow for randomization of inter-cell interference. This frequency hopped design allows for different bundles sizes. Each RB pair may frequency hop using the same sized bundles, where different RB may support different bundling sizes. For example, hopping between RB0 and RB10 may have a bundle size of 16, while hopping between RB1 and RB11 may be bundle size 64.

For devices with a single receiver, successful communications may require increases in signal-to-noise ratio (SNR) requirements. For link budget limited devices, increasing SNR requirements may entail the use of large bundling sizes. For MTC devices with coverage enhancements, up to 155.7 dB of maximum coupling loss may need to be supported with bundling sizes between 80 and 160, depending on MTC_SIB size. For example, for a PSDCH with a transport block size of 328, MCS of 3 and 6 resource blocks, the target SNR may be −14.9 dB, with a coupling loss of 156.35 dB, 80 transmissions may be needed, 40 bundled with 2 hops and cycling. A PDSCH with a transport block size of 1000, MCS of 10 and 6 RBs with a target SNR of −14.3 dB, coupling loss of 155.75 dB, may require 160 transmissions with 40 bundles, 4 hops and cycling.

In systems configured for MBSFN with eMBMS only certain subframes are reserved for DL traffic to the UE and all other subframes may be configured for MBSFN information. For example, for FDD, subframes 0, 4, 5, and 9, and for TDD, subframes 0, 1, 5, and 6, are reserved for DL traffic to the UE. However, ePDCCH, PSS/SSS, SIB, and Repeated PBCH are all transmitted in the center 6 RBs of a subframe. As a result, resources are limited and it may be difficult to determine where a SIB may be transmitted. This difficulty in locating the SIB is further magnified because the SIB contains MBSFN information, and thus before the SIB is decoded, the eMBMS configuration is also unknown.

Control Channel Design for Machine Type Communications

As noted above, aspects of the present disclosure provide techniques for signalling control information to machine type communication (MTC) devices using a relatively narrowband of overall system bandwidth, as compared to other (non MTC) devices in the wireless communication network.

Figure 7:
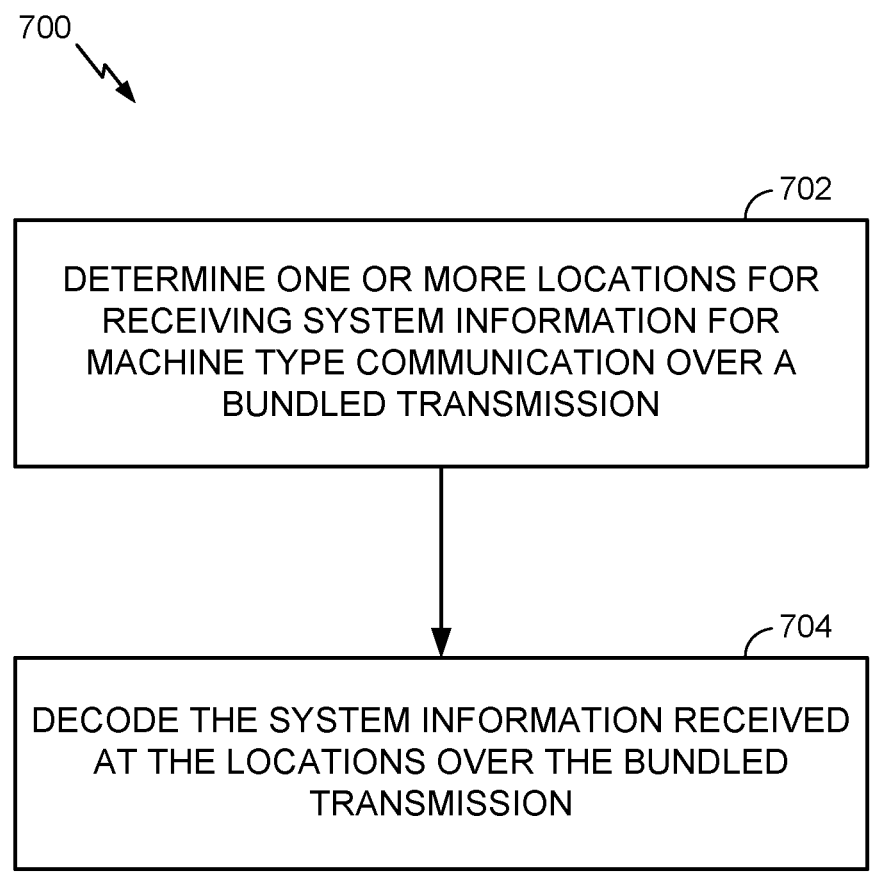
FIG. 7 illustrates example operations 700 that may be performed by a user equipment.

FIG. 7 illustrates example operations 700 that may be performed by a user equipment. The operations 700 may begin at 702 where, for example, one or more processors, such as the receive processor 258 and/or the controller/processor 280 of the user terminal 120 illustrated in FIG. 2, determine locations for receiving system information for machine type communication over a bundled transmission. At 704, the one or more processors of the user terminal 120, decoding the system information received at locations over the bundled transmission.

In the operations 700, the determination of the locations may be dependent, at least in part, on one or more services supported by the UE. In the operations 700, the services supported by the UE may be dependent, at least in part, on a service bandwidth. In the operations 700, the determination of the locations may be dependent, at least in part, on whether the UE supports multicast broadcast media service (MBMS). In the operations 700, the determination may be based on an MBMS configuration provided to the UE in a broadcast transmission. In the operations 700, the determining may comprise determining comprise decoding an MTC-specific control channel with scheduling information indicating the locations. In the operations 700, the one or more processors of the user terminal 120 may determine one or more subframes in which the MTC-specific control channel may be transmitted based on MBMS configuration information provided to the UE. In the operations 700, determining the locations may comprise determining one or more fixed locations for transmission of the system information. In the operations 700, determining the locations may comprise determining one or more fixed times for transmission of the system information. In the operations 700 the content of the system information may be fixed over a period of the bundled transmission. In the operations 700, the at least one of a modulation and coding scheme (MCS) or redundancy version (RV) for the system information may be fixed over a period of the bundled transmission. The operations 700 may further comprise receiving an indication of a change of at least one of the locations, content, MCS, or RV for the system information for a subsequent bundled transmission.

Figure 8:
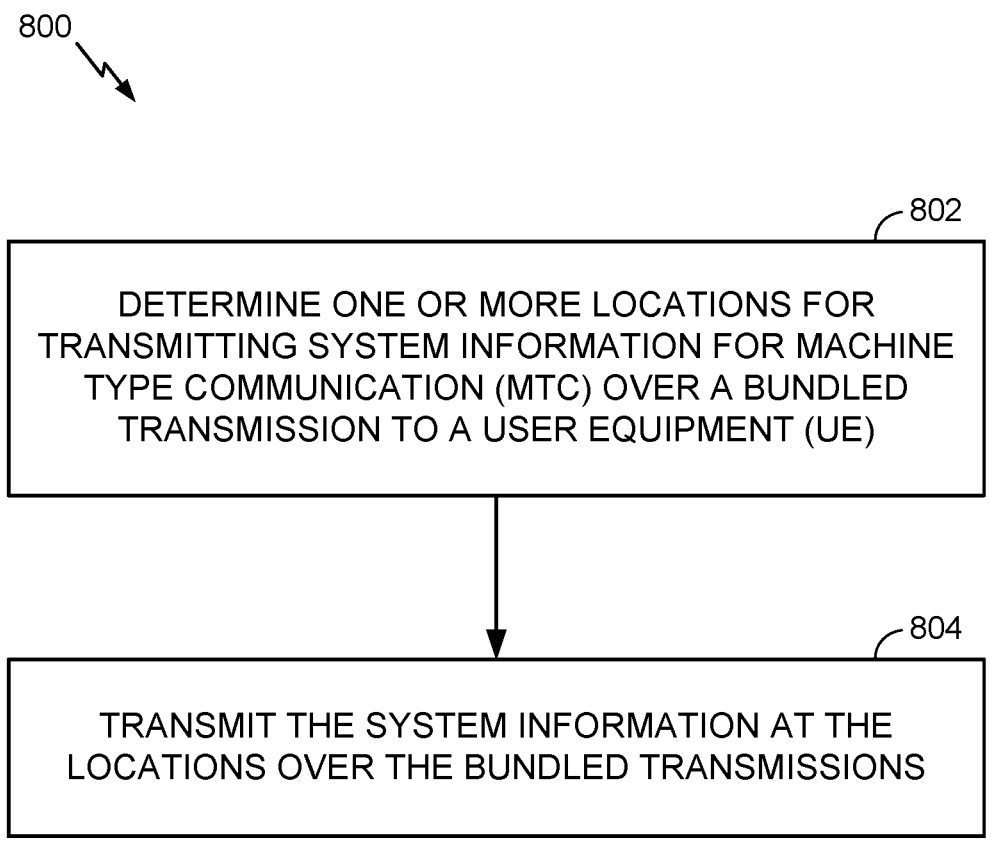
FIG. 8 illustrates example operations 800 that may be performed by a base station.

FIG. 8 illustrates example operations 800 that may be performed by a base station. The operations 800 may begin at 802 where, for example by one or more processors, such as the transmit processor 220 and/or the controller/processor 240 of the base station 110 illustrated in FIG. 2 determine one or more locations for transmitting system information for machine type communication (MTC) over a bundled transmission to a user equipment (UE). At 804, the one or more processors of the base station 110 transmits the system information at the locations over the bundled transmissions.

In the operations 800, the determination of the locations may be dependent, at least in part, on one or more services supported by the UE. In the operations 800, the services supported by the UE may be dependent, at least in part, on a service bandwidth. In the operations 800, the determination of the locations may be dependent, at least in part, on whether the UE supports multicast broadcast media service (MBMS). In the operations 800, the determination may be based on MBMS configuration provided to the UE in a broadcast transmission. The operations 800 may further comprise transmitting, to the UE, an MTC-specific control channel with scheduling information indicating the locations. The operations 800 may further comprise determining one or more subframes in which the MTC-specific control channel may be transmitted based on an MBMS configuration information provided to the UE. In the operations 800, determining the locations may comprise determining one or more fixed locations for transmission of the system information. In the operations 800, determining the locations may comprise determining one or more fixed times for transmission of the system information. In the operations 800, the at least one of a modulation and coding scheme (MCS) or redundancy version (RV) for the system information may be fixed over a period of the bundled transmission. The operations 800 may further comprise transmitting, to the UE, an indication of a change of at least one of the content, MCS, or RV for the system information for a subsequent bundled transmission.

During cell search and acquisition, a MTC device may detect the PSS/SSS signals transmitted by a wireless node. As indicated above, the PSS/SSS signal may contain the cell ID as well as an indication of the duplexing mode of the cell (e.g. FDD or TDD mode). After time synchronization, the PBCH is located and decoded to extract the cell bandwidth and antenna configuration. Based on the cell bandwidth, certain determinations about services available on the network may be determined. For example, for a network to support both eMBMS and MTCs with coverage enhancements, the network must have a bandwidth larger than 3 MHz. Since networks with 1.4 MHz or 3 MHz of bandwidth cannot support both eMBMS and MTC with coverage enhancements, there is no need for MTC_SIB restrictions based on possible eMBMS subframe configurations. However, a network with less than 3 MHz of bandwidth may be configured with eMBMS and MTC without coverage enhancements and are supported regardless of bandwidth.

A new MTC_ePDCCH may be defined to schedule the MTC_SIB for networks supporting MTCs with coverage enhancements and eMBMS. This MTC_ePDCCH may be a MTC specific control channel based on ePDCCH with a common search space defined to support scheduling MTC_SIB, paging, RAR messages, associated with MTC devices. This MTC_ePDCCH may be transmitted in all or a subset of the subframes that may not be configured for eMBMS (i.e., FDD subframes 0/4/5/9 and TDD subframes 0/1/5/6). As such, the MTC_ePDCCH assumes the worst eMBMS configuration is in use for the network.

According to certain aspects, the MTC_ePDCCH may be bundled with the PBCH and both transmitted in the center 6 RB of a subframe. To maintain commonality between FDD and TDD systems, the bundled PBCH may be transmitted in subframes 0 and 5. The bundled MTC_ePDCCH can then be transmitted in subframes 4 and/or 9 for FDD systems and subframes 1 and/or 6 for TDD systems.

For TDD systems, subframe 1 is a special subframe and subframe 6 may be a special subframe depending on the UL/DL configuration. Because subframe 6 may or may not be a special subframe, if subframe 6 may be used for the MTC_ePDCCH transmission, the MTC devices may be configured to assume that subframe 6 is a special subframe as the TDD subframe configuration of the network is unknown prior to MTC_SIB decoding. Where TDD subframe 6 is configured for MTC_ePDCCH, some limitations of the special subframe may apply to ensure there are sufficient DL symbols in the subframe. For example, it may be necessary to ensure that special subframes have at least 9 DL symbols available.

In some embodiments, where commonality between TDD and FDD systems need not be maintained, the MTC_SIB may be transmitted in all or a subset of the 0, 4, 5, and 9 subframes for FDD and all or a subset of the 0, 1, 5, and 6 subframes for TDD. The limitations of the special subframes for TDD continue to apply in such systems.

In some embodiments for networks supporting MBMS and MTC with coverage enhancements, rather than assuming the worst MBMS configuration and limiting control information to specific subframes, information about the MBMS configuration may be provided. This may be performed by including, in the PBCH using a PBCH reserved field, an indication of the MBMS configuration or SIB bundling subframes. The MTC device may then listen for the bundled MTC_SIB at the provided times.

In some embodiments, a new MTC_PBCH may be defined. This MTC_PBCH may contain an indication of the MBMS configuration or the SIB bundling subframes.

As noted above, the MTC_ePDCCH may indicate the frequency location of the MTC_SIB. This frequency location may be location outside of the center 6 RBs of a subframe to address the resource limitations in the worst case MBMS configuration and bundling scenarios.

In some embodiments, rather than using MTC_ePDCCH to indicate the location of MTC_SIB, the MTC_SIB may be transmitted in known, fixed location in the band edge. Where the MTC_SIB is transmitted in a fixed location, a MTC may decode the PBCH to determine the bandwidth of the network and then look for the SIBs in the band edge.

In some embodiments, both the MTC_ePDCCH and the MTC_SIB may be transmitted in other subbands other than the particular assignment. The location of the MTC_ePDCCH may be signaled by the PBCH, or the MTC_ePDCCH and MTC_SIB may be located at fixed locations.

In some embodiments, the bundles sizes of at least a subset of PBCH, MTC_ePDCCH and MTC_SIB may be mapped, reducing transmission of the bundles sizes. For example the PBCH bundle sizes may be mapped such that where the PBCH bundling is of a certain, specified, size X, it may be assumed that the MTC_ePDCCH bundle size is another specified size Y.

In some embodiments, MTC_SIB retransmissions may be fixed for an extended time period and coverage enhancements may be achieved by combining multiple MTC_SIBs over time. Procedurally, for cell acquisition and search, fixing the MTC_SIB for an extended time period would operate similarly to current SIB1 acquisition and allow for a unified design for both TDD and FDD modes independent of the eMBMS configurations. For example, a MTC_SIB may transmitted every 20 ms in either subframe 5 of the even radio frames or the odd radio frames. The MTC_SIB content may then be fixed over an extended period. In the case of 160 times combining, MTC_SIB content would then be fixed over 160*20 ms=3.2 seconds. The RB, MCS, and redundancy version (RV) of the MTC_SIB would be fixed over this time period, allowing for a simple combining of the log likelihood ratios (LLRs) after demodulation. If RB, MCS, or RV needs to be changed across a time period, this change may be signaled. This signaling may be done via PBCH reserved bits, or by using the ePDCCH. Where signaling is performed using ePDCCH, the ePDCCH may be bundled prior to the start of the time period in which the change is to be implemented, allowing the MTC device to be aware of the SIB assignment prior to the change. In some embodiments, the ePDCCH signaling the change may be transmitted together with the SIB using a predetermined ePDCCH transmission, so the LLR for the ePDCCH may be combined across transmissions as well.

As noted above, aspects of the present disclosure provide various techniques for signalling control information to machine type communication (MTC) devices using a relatively narrowband of overall system bandwidth.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software/firmware component(s) and/ or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining one or more locations for system information for MTC over a bundled transmission, means for determining one or more subframes, means for decoding an MTC-specific control channel, means for determining one or more fixed locations, means for determining one or more fixed times, and/or means for decoding the system information may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining one or more locations for receiving a bundled system information block (SIB) transmission for machine type communication (MTC);
   receiving an indication in a reserved field of a physical broadcast channel (PBCH) indicating a redundancy version (RV) and a modulation coding scheme (MCS) for the bundled SIB and one or more SIB retransmissions; and
   decoding the bundled SIB received at the one or more locations, wherein:

the decoding includes combining SIB retransmissions received over a period using the indicated RV and MCS, and content of the system information for the SIB retransmissions is fixed over the period.

2. The method of claim 1, further comprising determining one or more services supported by the UE.

3. The method of claim 2, wherein the one or more services supported by the UE is dependent, at least in part, on a service bandwidth.

4. The method of claim 2, wherein the one or more services comprises at least one of: multicast broadcast media service (MBMS) or coverage enhancement.

5. The method of claim 4, further comprising receiving an MBMS configuration provided to the UE in a broadcast transmission.

6. The method of claim 1, wherein
an MTC-specific control channel with scheduling information indicating the one or more locations is not received.

7. The method of claim 1, wherein determining the one or more locations further includes determining one or more fixed frequency locations for transmission of the bundled SIB.

8. The method of claim 1, wherein determining the one or more locations comprises determining subframes for transmission of the bundled SIB based on a received PBCH transmission including a reserved field indicating the subframes.

9. The method of claim 1, wherein determining the one or more locations comprises determining frequency hopped locations for bundled SIBs having a same bundling size in a physical resource block (PRB) pair.

10. The method of claim 1, wherein the PBCH is received in subframe 0 and subframe 5.

11. A method for wireless communications by a base station (BS), comprising:
determining one or more locations for transmitting a bundled system information block (SIB) to a user equipment (UE) for machine type communication (MTC);
transmitting the bundled SIB at the one or more locations;
transmitting one or more SIB retransmissions over a period, wherein a content of the system information for the SIB retransmissions is fixed over the period; and
transmitting an indication in a reserved field of a physical broadcast channel (PBCH) indicating a redundancy version (RV) and a modulation coding scheme (MCS) for the bundled SIB and SIB retransmissions.

12. The method of claim 11, wherein the determination of the one or more locations is dependent, at least in part, on one or more supported services.

13. The method of claim 12, wherein the one or more supported services is dependent, at least in part, on a service bandwidth.

14. The method of claim 12, wherein the one or more services comprises at least one of: multicast broadcast media service (MBMS) or coverage enhancements.

15. The method of claim 14, further comprising providing an MBMS configuration to the UE in a broadcast transmission.

16. The method of claim 11, further comprising: refraining from transmitting, to the UE, an MTC-specific control channel with scheduling information indicating the one or more locations.

17. The method of claim 11, wherein determining the one or more locations further includes determining one or more fixed frequency locations for transmitting the bundled SIB.

18. The method of claim 11, wherein:
determining the one or more locations comprises determining subframes for transmission of the bundled SIB; and
the method further comprises transmitting a reserved field in the PBCH indicating the subframes.

19. The method of claim 11, wherein determining the one or more locations comprises determining frequency hopped locations for transmission of bundled SIBs having a same bundling size in a physical resource block (PRB) pair.

20. An apparatus for wireless communications comprising:
at least one processor coupled with a memory having instructions stored thereon, the at least one processor configured to:
determine one or more locations for receiving a bundled system information block (SIB) transmission for machine type communication (MTC);
decode the bundled SIB received at the one or more locations by combining SIB retransmissions received over a period, wherein content of the system information for the SIB retransmissions is fixed over the period; and
a receiver configured to:
receive an indication in a reserved field of a physical broadcast channel (PBCH) indicating a redundancy version (RV) and a modulation coding scheme (MCS) for the bundled SIB and SIB retransmissions, wherein the combining uses the indicated RV and MCS; and
receive the bundled SIB and SIB retransmissions over the period.

21. The apparatus of claim 20, wherein the at least one processor is further configured to determine one or more services supported by the apparatus.

22. An apparatus for wireless communications comprising:
at least one processor coupled with a memory having instructions stored thereon, the at least one processor configured to determine one or more locations for transmitting a bundled system information block (SIB) to a user equipment (UE) for machine type communication (MTC); and
a transmitter configured to:
transmit the bundled SIB at the one or more locations;
transmit one or more SIB retransmissions over a period, wherein a content of the system information for the SIB retransmissions is fixed over the period; and
transmit an indication in a reserved field of a physical broadcast channel (PBCH) indicating a redundancy version (RV) and a modulation coding scheme (MCS) for the bundled SIB and SIB retransmissions.

23. The apparatus of claim 22, wherein the determination of the one or more locations is dependent, at least in part, on one or more supported services.

* * * * *